United States Patent [19]

Sasaki

[11] Patent Number: 5,623,512
[45] Date of Patent: Apr. 22, 1997

[54] RATE CONVERTING DEVICE CAPABLE OF DETERMINING A TRANSMISSION RATE AS DESIRED

[75] Inventor: Katsuhiro Sasaki, Tokyo, Japan

[73] Assignee: NEC Corporation, Tokyo, Japan

[21] Appl. No.: 305,899

[22] Filed: Sep. 14, 1994

[30] Foreign Application Priority Data

Sep. 14, 1993 [JP] Japan .................................. 5-252271

[51] Int. Cl.$^6$ ...................................... H04B 3/36
[52] U.S. Cl. .................. 375/211; 375/215; 375/220; 375/372; 375/377; 370/545; 341/61
[58] Field of Search ..................................... 375/354, 371, 375/372, 377, 211, 215, 220; 370/84, 100.1, 101, 105.1, 105.4–106, 55; 341/61; 365/189.01, 189.02, 192, 195, 198

[56] References Cited

U.S. PATENT DOCUMENTS

| | | | |
|---|---|---|---|
| 4,924,459 | 5/1990 | Angell et al. | 370/84 |
| 5,434,890 | 7/1995 | Kimura et al. | 370/105.1 |

FOREIGN PATENT DOCUMENTS 64-42958  2/1989  Japan .

*Primary Examiner*—Stephen Chin
*Assistant Examiner*—Amanda T. Le
*Attorney, Agent, or Firm*—Sughrue, Mion, Zinn, Macpeak & Seas

[57] ABSTRACT

On converting an input data signal having a first transmission rate into an output data signal having a second transmission rate different from the first transmission rate, the input data signal is memorized as a memorized input data signal a first memory. A read clock generating circuit generates a read clock signal to read the memorized input data signal as a read data signal out of the first memory. A read control circuit controls the read clock generating circuit to stop generation of the read clock signal in order to make the read data signal have an overhead bit slot at a predetermined period. A rate control circuit produces a rate control signal having a predetermined pattern and an inhibit signal in accordance with the rate control signal. The read clock generating circuit stops generation of the read clock signal in response to the inhibit signal. A multiplexing circuit multiplexes an information signal to the read data signal on the basis of the rate control signal to produce the output data signal. The information signal is representative of whether or not a specific overhead bit slot has a data bit of the input data signal.

7 Claims, 4 Drawing Sheets

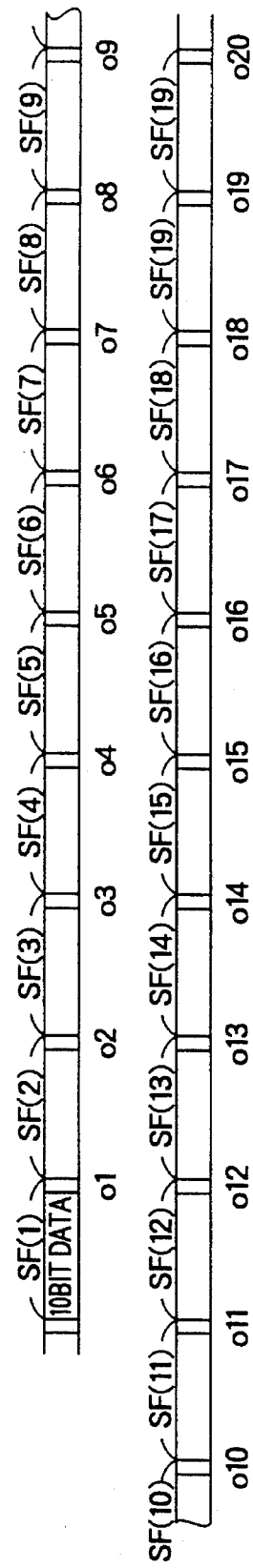
FIG. 5
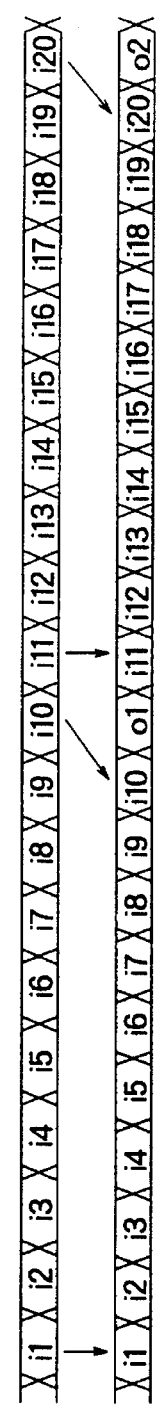
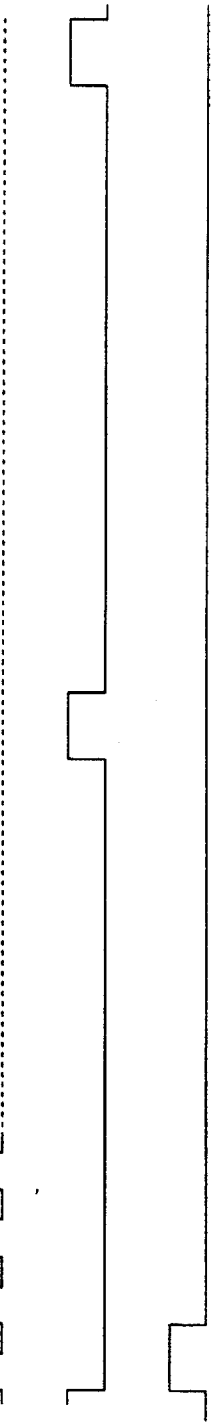
FIG. 3(a)
FIG. 3(b)
FIG. 3(c)
FIG. 3(d)
FIG. 3(e)
FIG. 3(f)

RATE CONVERTING DEVICE CAPABLE OF DETERMINING A TRANSMISSION RATE AS DESIRED

BACKGROUND OF THE INVENTION

This invention relates to a rate converting device for converting an input data signal having an input transmission rate into an output data signal having an output transmission rate.

In general, a rate converting device is for use in a communication system comprising first and second communication circuits which are connected to each other through a communication path having a path transmission rate. The communication system may be, for example, a digital radio communication system. The communication path may be, for example, a radio channel.

When the first communication circuit communicates with the second communication circuit through the communication path, the first communication circuit is supplied with an input data signal having an internal transmission rate different from the path transmission rate. Inasmuch as the internal transmission rate is different from the path transmission rate, the first communication circuit comprises the rate converting device for converting the input data signal having the internal transmission rate into an output data signal having the path transmission rate. The output data signal is modulated into a first transmission signal which is transmitted to the second communication circuit through the communication path.

On the other hand, the first communication circuit may receive a second transmission signal having the path transmission rate from the second communication circuit. The first communication circuit demodulates the second transmission signal into a demodulated signal having the path transmission rate. The rate converting device is operable to convert the demodulated signal into a converted signal having the internal transmission rate. Similarly, the second communication circuit comprises the rate converting device.

A conventional rate converting device is disclosed in Japanese Unexamined Publication Tokkai Hei 1-42958 (42958/1989). The conventional rate converting device comprises a transmission rate converting section and a reception rate converting section. The transmission rate converting section is operable to convert the input data signal having the internal transmission rate into the output data signal having the path transmission rate. The reception rate converting section is operable to convert the demodulated signal having the path transmission rate into the converted signal having the internal transmission rate.

Now, it will be assumed that the internal transmission rate is represented by f1 and the path transmission rate is represented by f2. A relationship between the internal transmission rate and the path transmission rate is given by:

$$f2 = (m/n)f1,$$

where m and n are first and second natural numbers, respectively. The first natural number m is greater than the second natural number n.

It will be assumed that the output data signal has an output frame of a frame length L. Inasmuch as the frame length L must generally be not shorter than the first natural number m, it is to be noted that the frame length L becomes long in order to make the path transmission rate high. Namely, it is to be noted that the path transmission rate is defined by the frame length L. As a result, it is difficult to set the path transmission rate as desired independent of the frame length in the conventional rate converting device.

SUMMARY OF THE INVENTION

It is therefore an object of this invention to provide a rate converting device capable of determining a transmission rate as desired.

Other objects of this invention will become clear as the description proceeds.

On describing the gist of this invention, it is possible to understand that a rate converting device comprises a transmission rate converting section for converting transmission input data signal into a transmission output data signal in accordance with a transmission input clock signal. The transmission input data signal has a first transmission rate. The transmission output signal has a second transmission rate different from the first transmission rate.

According to this invention, the transmission rate converting section comprises first memory means for memorizing the transmission input data signal as a first memorized data signal in accordance with a first write clock signal, first producing means responsive to the transmission input clock signal for producing the first write clock signal, second producing means for producing a first clock control signal in accordance with the first write clock signal and a first read clock signal, third producing means responsive to the first clock control signal for producing a first inhibit signal and a first frame pulse signal which is representative of a transmission frame period of the transmission output data signal, and fourth producing means operable in accordance with the first clock control signal for producing a rate control signal having a predetermined pattern on the basis of the first frame pulse signal. The fourth producing means produces an additional inhibit signal in accordance with the rate control signal.

The transmission rate converting section further comprises first generating means for generating the first read clock signal in accordance with the first clock control signal to read the first memorized data signal as a first read data signal out of the first memory means. The generating means stops generation of the first read clock signal in response to the first inhibit signal. Furthermore, the generating means stops generation of the first read clock signal in response to the additional inhibit signal. The transmission rate converting section still further comprises multiplexing means responsive to the rate control signal and the frame pulse signal for multiplexing an information signal having a logic pattern to the first read data signal to produce the transmission output data signal.

BRIEF DESCRIPTION OF THE DRAWINGS

FIG. 3 is a timing chart for describing operation of the rate converting device illustrated in FIG. 2;

FIG. 5 is a signal format of an output data signal outputted from a multiplexing circuit illustrated in FIG. 2.

DESCRIPTION OF THE PREFERRED EMBODIMENT

Figure 1:
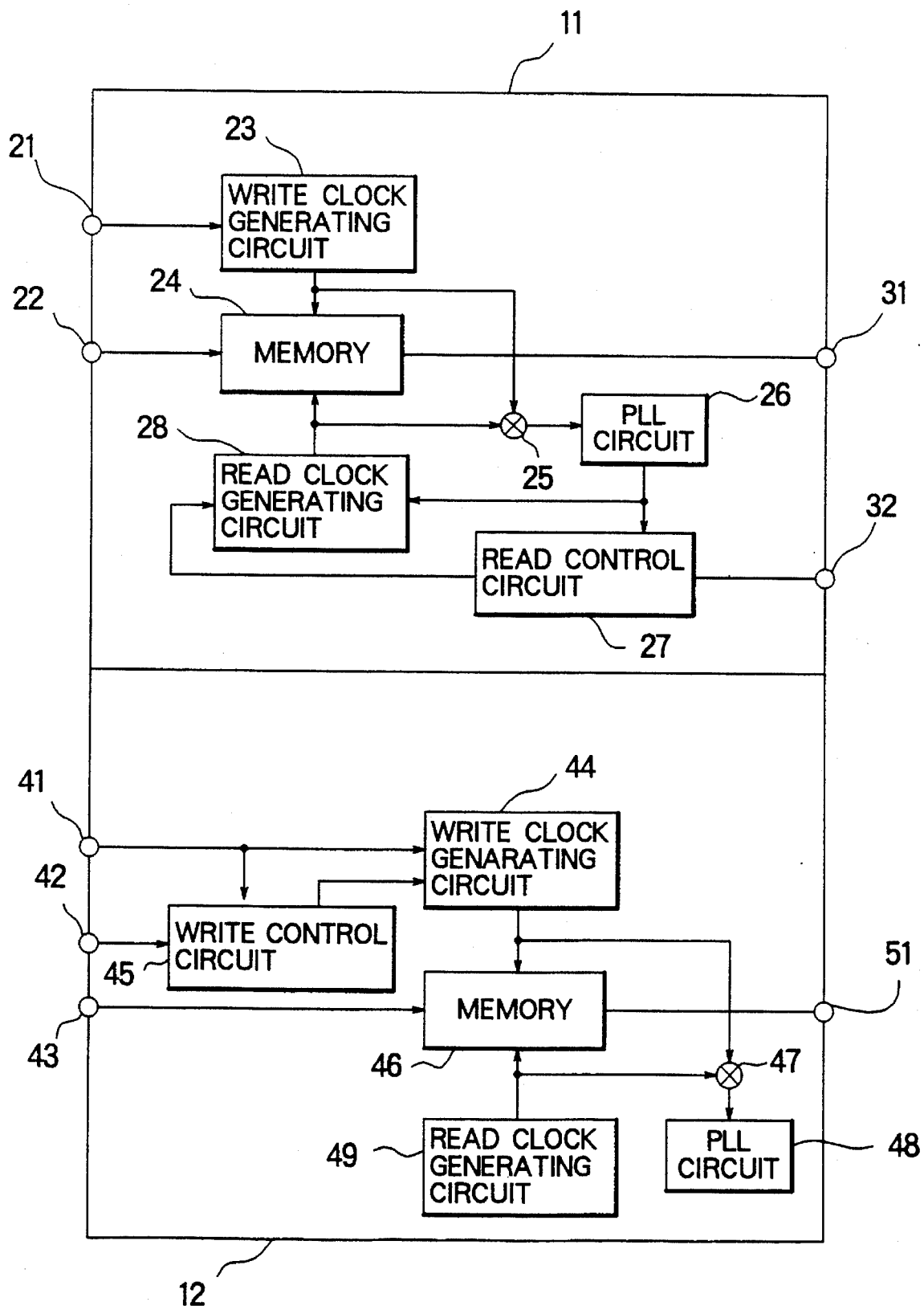
FIG. 1 is a block diagram of a conventional rate converting device.

Referring to FIG. 1, a conventional rate converting device will be described at first in order to facilitate an understanding of this invention. The illustrated rate converting device is for use in a communication system comprising first and second communication circuits which are connected to each other through a communication path, for example, a radio channel. More particularly, each of the first and the second communication circuits has the rate converting device comprising a transmission rate converting section 11 and a reception rate converting section 12.

The transmission rate converting section 11 is for converting a transmission input data signal having a first transmission rate into a transmission output data signal having a second transmission rate. The first transmission rate may be called an internal transmission rate. The second transmission rate may be called a path transmission rate which is representative of a transmission rate of the communication path.

The reception rate converting section 12 is for converting a reception input data signal having the second transmission rate into a reception output data signal having the first transmission rate.

The transmission rate converting section 11 has first and second transmission input terminals 21 and 22. The first transmission input terminal 21 is connected to a first write clock generating circuit 23. The second transmission input terminal 22 is connected to a first memory 24, for example, a first-in-first-out memory.

The first memory 24 is supplied with a transmission input data signal having a first transmission rate through the second transmission input terminal 22. The first write clock generating circuit 23 is supplied with a transmission clock signal in synchronization with the transmission input data signal through the first transmission input terminal 21. The first write clock generating circuit 23 divides the transmission clock signal at a predetermined dividing rate to generate a first write clock signal. Supplied with the first write clock signal, the first memory 24 memorizes the transmission input data signal as a memorized input data signal. The memorized input data signal is read as a first read data signal out of the first memory 24 in accordance with a first read clock signal as will be described hereinafter.

The first write and the first read clock signals are supplied to a first phase comparator circuit 25. The first phase comparator circuit 25 compares the first write clock signal with the first read clock signal to produce a first phase control signal representative of a phase difference between the first write clock signal and the first read clock signal. The first phase control signal is delivered to a first phase locked loop (PLL) circuit 26.

The first PLL circuit 26 produces a first control clock signal on the basis of the first phase control signal. The first control clock signal has a predetermined frequency. The first control clock signal is sent to a read control circuit 27 and a first read clock generating circuit 28.

The read control circuit 27 produces a frame pulse signal in accordance with the first control clock signal. The frame pulse signal is representative of a frame period of a first output data signal which will later be described. Furthermore, the read control circuit 27 produces a first inhibit signal at a predetermined period on the basis of the first control clock signal. The first inhibit signal is supplied to the read clock generating circuit 28.

As described above, the first control clock signal is supplied to the first read clock generating circuit 28. Responsive to the first control clock signal, the read clock generating circuit 28 generates the first read clock signal to read the first memorized input data signal as the first read data signal out of the memory 24. When the first read clock generating circuit 28 receives the first inhibit signal, the first read clock generating circuit 28 stops generation of the first read clock signal. As a result, the first read data signal has an output frame comprising an overhead bit slot or location and has a second transmission rate different from the first transmission rate. In the example being illustrated, the second transmission rate is higher than the first transmission rate.

The first read data signal is sent as the first output data signal to a modulator circuit (not shown) through a first transmission output terminal 31. Similarly, the frame pulse signal is sent to the modulator circuit through a second transmission output terminal 32. On the basis of the frame pulse signal, the modulator circuit modulates the first output data signal into a modulated signal which is transmitted as a transmission signal on the communication path.

Now, it will be assumed that the first communication circuit transmits the transmission signal on the communication path. The transmission signal is received as a reception signal at the second communication circuit. As known in the art, the second communication circuit demodulates the reception signal into a demodulated signal. Furthermore, the second communication circuit establishes synchronization with the demodulated signal to produce a reception clock signal, a reception frame pulse signal and a reception data signal having the second transmission rate. The reception clock signal, the reception frame pulse signal and the reception data signal are supplied to the reception rate converting section 12 in the second communication circuit.

The reception rate converting section 12 has first through third reception input terminals 41 to 43. The first reception input terminal 41 is connected to a second write clock generating circuit 44 and a write control circuit 45. The second reception input terminal 42 is connected to the write control circuit 45. The third reception input terminal 43 is connected to a second memory 46, for example, a first-in-first-out memory.

The second memory 46 is supplied with the reception data signal through the third reception input terminal 43. The second write clock generating circuit 44 is supplied with the reception clock signal through the first reception input terminal 41. The second write clock generating circuit 44 divides the reception clock signal at a predetermined dividing rate to generate a second write clock signal. Supplied with the second write clock signal, the second memory 46 memorizes the reception data signal as a second memorized data signal. The second memorized data signal is read as a second output data signal out of the second memory 46 in accordance with a second read clock signal as will later be described.

The write control circuit 45 is supplied with the reception clock signal through the first reception input terminal 41. Furthermore, the write control circuit 45 is supplied with the reception frame pulse signal through the second reception input terminal 42. The write control circuit 45 produces a second inhibit signal at the location of the overhead bit slot of the reception data signal in accordance with the reception clock signal and the reception frame pulse signal. Responsive to the second inhibit signal, the second write clock generating circuit 44 stops generation of the second write clock signal. As a result, the overhead bit slot is not memorized in the second memory 46.

The second write and the second read clock signals are supplied to a second phase comparator circuit 47. The second phase comparator circuit 47 compares the second write clock signal with the second read clock signal to produce a second phase control signal representative of a second phase difference between the second write clock signal and the second read clock signal. The second phase control signal is delivered to a second phase locked loop (PLL) circuit 48.

The second PLL circuit 48 produces a second control clock signal on the basis of the second phase control signal as known in the art. The reception clock control signal has a prescribed frequency. The second control clock signal is sent to a second read clock generating circuit 49.

Responsive to the second control clock signal, the second read clock generating circuit 49 generates the second read clock signal to read the second memorized input data signal as the second output data signal out of the second memory 46. The second output data signal has the first transmission rate. For example, the second output data signal is sent to a processing unit (not shown) through a reception output terminal 51 to be processed into a processed signal.

Now, it will be assumed that the first transmission rate is represented by f1 and the second transmission rate is represented by f2. A relationship between the first transmission rate and the second transmission rate is given by:

$$f1=(m/n)f1,$$

where m and n are first and second natural numbers, respectively. The first natural number m is greater than the second natural number n.

It will be assumed that the first output data signal has an output frame of a frame length L. Inasmuch as the frame length L must not be shorter than the first natural number m, it is necessary to make the frame length L longer in cases where the second transmission rate is high. Namely, the path transmission rate is defined by the frame length L. As a result, it is difficult to set the second transmission rate as desired irrespective of the frame length in the conventional rate converting device.

Figure 2:
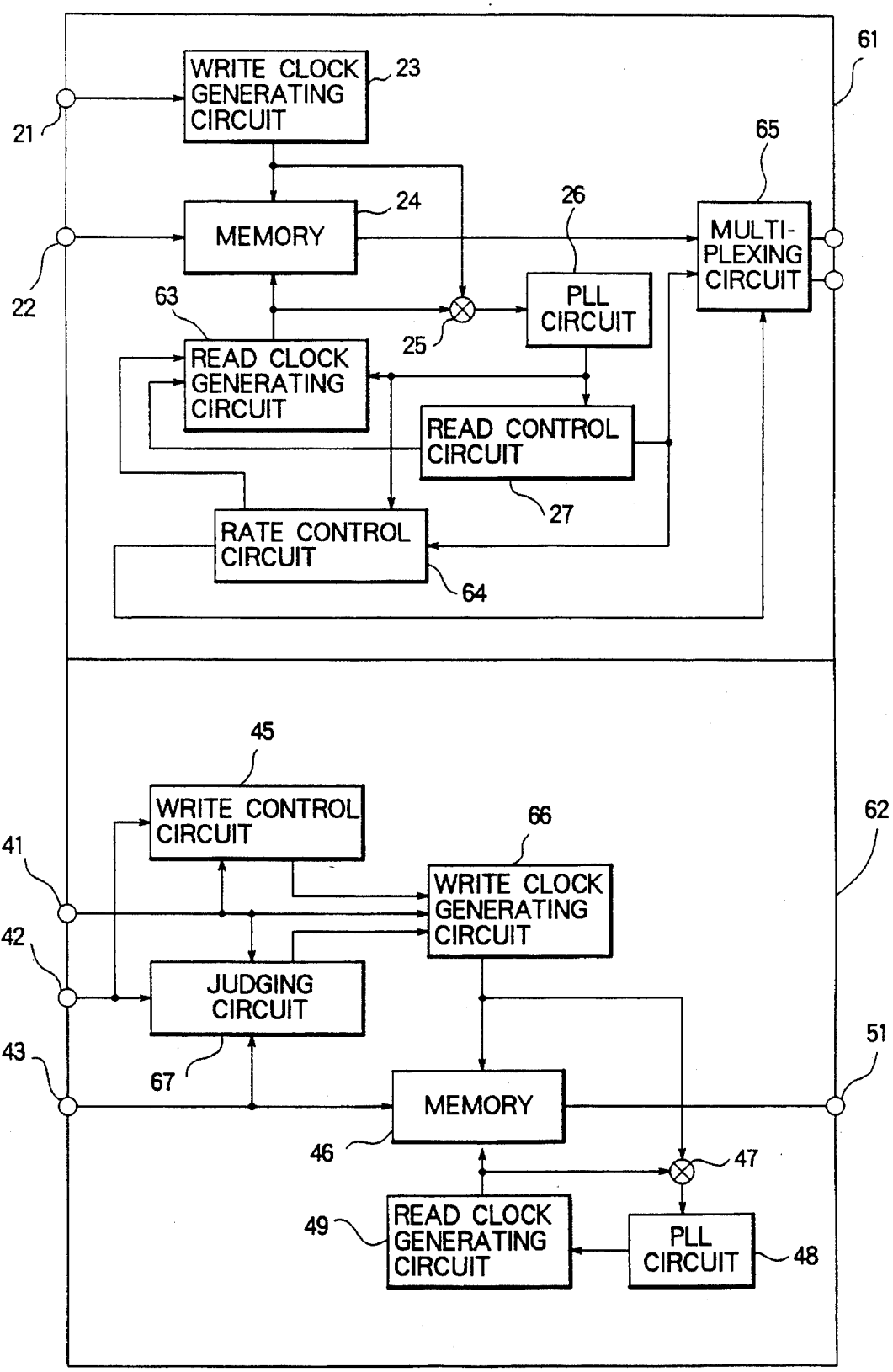
FIG. 2 is a block diagram of a rate converting device according to a preferred embodiment of this invention.

Referring to FIG. 2, description will proceed to a rate converting device according to a preferred embodiment of this invention. The illustrated rate converting device is provided in each of the first and the second communication circuits described in conjunction with FIG. 1. The rate converting device comprises a transmission rate converting section and a reception rate converting section which are different in structure from the transmission rate converting section 11 and the reception rate converting section 12 illustrated in FIG. 1 and which are therefore designated afresh by reference numerals 61 and 62. Each of the transmission and the reception rate converting sections 61 and 62 comprises similar parts which are designated by like reference numerals and operable with likewise named signals.

The transmission rate converting section 61 further comprises a first read clock generating circuit which is different in structure from the first read clock generating circuit 28 illustrated in FIG. 1 and which is therefore designated by a reference numeral 63. In addition, the transmission rate converting section 61 comprises a rate control circuit 64 which will later be described. The transmission rate converting section 61 comprises a multiplexing circuit 65.

The reception rate converting section 62 further comprises a second write clock generating circuit which is different in structure from the second write clock generating circuit 44 illustrated in FIG. 1 and which is therefore designated by a reference numeral 66. In addition, the reception rate converting section 62 comprises a judging circuit 67 which will later be described.

Referring to FIG. 3 in addition to FIG. 2, the first write clock generating circuit 23 is supplied with the transmission clock signal shown at a first or top row labelled (a) in FIG. 3. As described in conjunction with FIG. 1, the transmission clock signal is in synchronization with the transmission input data signal. The first memory 24 is supplied with the transmission input data signal having the first transmission rate through the second transmission input terminal 22. The first transmission input data signal has first through N-th input data bits i1 to iN as shown at a second row labelled (b) in FIG. 3, where N represents a positive integer which is greater than one, although only the first through the twentieth input data bits i1 to i20 are illustrated at the second row (b) in FIG. 3.

As described in conjunction with FIG. 1, the first memory 24 memorizes the transmission input data signal as the first memorized data signal in accordance with the first write clock signal given from the first write clock generating circuit 23. The memorized input data signal is read as the first read data signal out of the first memory 24 in accordance with the first read clock signal. Although description will be made hereinafter, the first read data signal has an output format shown at a third row labelled (c) in FIG. 3.

Responsive to the first write clock signal and the first read clock signal, the first phase comparator circuit 25 supplies the PLL circuit 26 with the first phase control signal. On the basis of the first phase control signal, the PLL circuit 26 supplies the read control circuit 27, the read clock generating circuit 63, and the rate control circuit 64 with the first control clock signal shown at a fourth row labelled (d) in FIG. 3.

As described in conjunction with FIG. 1, the read control circuit 27 produces frame pulse signal and the first inhibit signal in response to the control clock signal. More particularly, the read control circuit 27 counts the clock pulses of the first control clock signal to produce a first count. When the first count reaches a predetermined number, for example, ten, the read control circuit 27 produces the first inhibit signal having a high level as shown at a fifth row labelled (e) in FIG. 3. Furthermore, the output frame period has been set in the read control circuit 27. The read control circuit 27 counts the clock pulses of the control clock signal to produce a second count. When the second count reaches the output frame period, the read control circuit 27 produces the frame pulse signal as shown at a sixth row labelled (f) in FIG. 3. When the read control circuit 27 produces the frame pulse signal, the first inhibit signal is not produced in the read control circuit 27.

The first read clock generating circuit 63 generates the first read clock signal in accordance with the first control clock signal shown at the fourth row (d) in FIG. 3. When the first read clock generating circuit 63 is supplied with the first inhibit signal, the first read clock generating circuit 63 stops generation of the first read clock signal. As a result, the first memorized input data signal is not read out of the first memory 24.

As described above, the first inhibit signal is supplied from the read control circuit 27 to the read clock generating circuit 63 when the first count reaches ten. Therefore, the first read data signal has a vacant or overhead bit slot at every ten bits. More particularly, the first read data signal has an output format shown at the third row (c) in FIG. 3. Namely, a first overhead bit slot o1 is inserted after the tenth input data bit i10. A second overhead bit slot o2 is inserted after the twentieth input data bit i20.

As described above, the first control clock signal and the frame pulse signal are supplied to the rate control circuit 64. The rate control circuit 64 is operable in accordance with the first control clock signal and produces a rate control signal on the basis of the frame pulse signal.

Figures 4A, 4B, 4C:
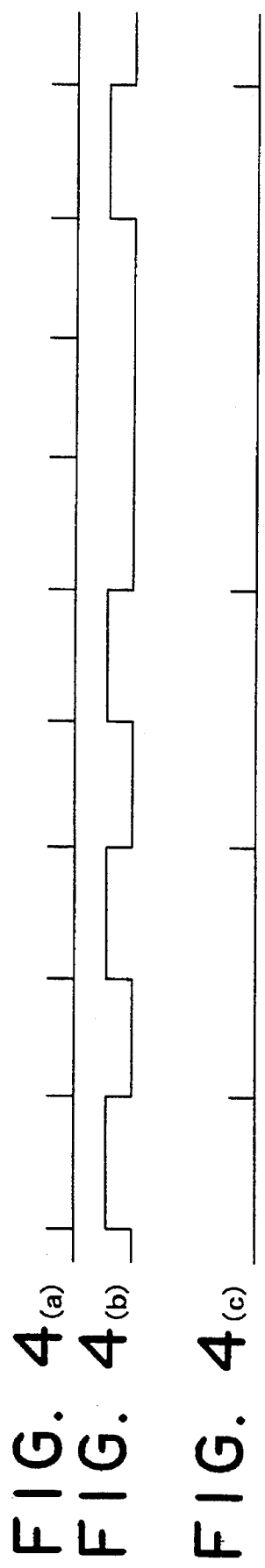
FIG. 4 is a timing chart for describing operation of a frequency control signal producing circuit illustrated in FIG. 2.

Referring to FIG. 4 in addition to FIG. 2, the read control circuit 27 produces the frame pulse signal having the frame period as shown at a first or top row labelled (a) in FIG. 4. The rate control signal has a predetermined pattern having a high level and a low level. More specifically, the rate control signal has first through M-th signal parts which are repeated in an ascending order, where M represents a positive number which is greater than one. In the example being illustrated, the positive number M is equal to eight. Each of the first, the third, and the fifth signal parts has the high level over the frame period as shown at a second row labelled (b) in FIG. 4. Each of the second, the fourth, the sixth, the seventh, the eighth signal parts has the low level over the frame period as shown at the second row (b) in FIG. 4. Furthermore, the rate control circuit 64 produces an additional inhibit signal having an inhibit pulse at a trailing edge of each of the first, the third, and the fifth signal parts as shown at a third row labelled (c) in FIG. 4. The additional inhibit signal is supplied to the first read clock generating circuit 63. Responsive to the additional inhibit signal, the first read clock generating circuit 63 stops generation of the read clock signal.

Referring to FIG. 5 in addition to FIG. 2, it will be assumed that the first read data signal has an output frame format which comprises first through K-th subframes each of which has ten data bits and the overhead bit slot, where K represents a positive integer which is greater than one. In the illustrated example, the positive integer K is equal to twenty. As readily understood from the above description, the overhead bit slot of the twentieth subframe may have the data bit in FIG. 5.

The multiplexing circuit 65 is supplied with the frame pulse signal and the rate control signal. The multiplexing circuit 65 judges whether or not the overhead bit slot of the twentieth subframe has the data bit in accordance with the frame pulse signal and the rate control signal. In accordance with the result, the multiplexing circuit 65 multiplexes an information signal to the first read data signal to produce a multiplexed data signal as the first output signal. More particularly, the information signal has first through third information bits. When the overhead bit slot of the twentieth subframe has the data bit, each of the first through the third information bits is equal to a logic "0". When the overhead bit slot of the twentieth subframe is a vacant slot, each of the first through the third information bits is equal to a logic "1". In the example being illustrated in FIG. 5, the first information bit is inserted in the overhead bit slot of the second subframe. The second information bit is inserted in the overhead bit slot of the sixth subframe. The third information bit is inserted in the overhead bit slot of the tenth subframe.

The multiplexed data signal is supplied to the modulator to be modulated into the transmission signal.

Referring alone to FIG. 2, it will be assumed that the first communication circuit transmits the transmission signal on the communication path as described in conjunction with FIG. 1. The transmission signal is received as the reception signal at the second communication circuit. The second communication circuit demodulates the reception signal into a demodulated signal. Furthermore, the second communication circuit establishes synchronization with the demodulated signal to produce the reception signal, a reception frame signal, and a reception data signal having the second transmission rate. The reception clock signal, the reception frame signal, and the reception data signal are supplied to the reception converting section 62 in the second communication circuit.

In the reception converting section 62, the first reception input terminal 41 is connected to the write control circuit 45, the second write clock generating circuit 66, and the judging circuit 67. The second reception input terminal 42 is connected to the write control circuit 45 and the judging circuit 67. The third reception input terminal 43 is connected to the second memory 46 and the judging circuit 67.

Supplied with the reception clock signal through the first reception input terminal 41, the second write clock generating circuit 66 generates the second write clock signal as described in conjunction with FIG. 1. In accordance with the second write clock signal, the second memory 46 memorizes the reception data signal as the second memorized data signal.

As described in conjunction with FIG. 1, the write control circuit 45 produces the second inhibit signal at the location of each overhead bit slot of the reception data signal in accordance with the reception clock signal and the reception frame pulse signal. Responsive to the second inhibit signal, the second write clock generating circuit 66 stops generation of the second write clock signal.

Referring to FIG. 5 in addition to FIG. 2, the judging circuit 67 has a location data indicative of locations of the first through the third information bits in the reception data signal. More specifically, the judging circuit 67 knows that the first, the second, and the third information bits are inserted in the overhead bit slot of the second subframe, the overhead bit slot of the sixth subframe, and the overhead bit slot of the tenth subframe, respectively. Therefore, the judging circuit 67 searches the locations of the first through the third information bits in the reception data signal in accordance with the reception clock signal and the reception frame signal to extract the first through the third information bits as first through third extracted bits from the reception data signal.

The judging circuit 67 judges whether or not each of the first through the third extracted bits is the logic "0". When at least two of the first through the third extracted bits are the logic "1", the judging circuit 67 produces a second rate control signal at the overhead bit location of the twentieth subframe to supply the second rate control signal to the second write clock generating circuit 45. Responsive to the second rate control signal, the second write clock generating circuit 45 stops generation of the second write clock signal.

As described in conjunction with FIG. 1, the second memorized reception data signal is read as the second output data signal out of the second memory 46 in accordance with the second read clock signal supplied from the second read clock generating circuit 49. The second output data signal may be supplied to the processing unit through the reception output terminal 51 to be processed into the processed signal.

While this invention has thus far been described in conjunction with a preferred embodiment thereof, it will readily be possible for those skilled in the art to put this invention into practice in various other manners. For example, the information signal may have only the first information bit.

What is claimed is:

1. A rate converting device comprising a transmission rate converting section for converting a transmission input data signal into a transmission output data signal in accordance with a transmission input clock signal, said transmission input data signal having a first transmission rate, said transmission output data signal having a second transmission rate different from said first transmission rate, said transmission rate converting section comprising:

first memory means for memorizing said transmission input data signal as a first memorized data signal in accordance with a first write clock signal;

first producing means responsive to said transmission input clock signal for producing said first write clock signal;

second producing means for producing a first clock control signal in accordance with said first write clock signal and a first read clock signal;

third producing means responsive to said first clock control signal for producing a first inhibit signal and a first frame pulse signal which is representative of a transmission frame period of said transmission output data signal;

fourth producing means operable in accordance with said first clock control signal for producing a rate control signal having a predetermined pattern on the basis of said first frame pulse signal, said fourth producing means producing an additional inhibit signal in response to said rate control signal;

first generating means for generating said first read clock signal in accordance with said first clock control signal to read the first memorized data signal as a first read data signal out of said first memory means, said first read data signal having an output signal format comprising a plurality of subframes each of which has an overhead bit slot, said first generating means stopping generation of said first read clock signal in response to said first inhibit signal, said first generating means stopping generation of said first read clock signal in response to said additional inhibit signal; and inserting means responsive to said rate control signal and said first frame pulse signal for inserting an information signal having a logic pattern into at least one of said overhead bit slots of said subframes to produce said transmission output data signal.

2. A rate converting device as claimed in claim 1, wherein said second producing means comprises:

a first phase comparator circuit for comparing said first write clock signal with said first read clock signal to produce a first phase control signal representative of a phase difference between said first write clock signal and said first read clock signal; and a first phase locked loop circuit for producing said first clock control signal on the basis of said first phase control signal.

3. A rate converting device as claimed in claim 2, wherein said first memory is a first-in-first-out memory.

4. A rate converting device as claimed in claim 1, wherein said information signal is representative of whether or not a specific overhead bit slot has a data bit of said input data signal.

5. A rate converting device as claimed in claim 4, said rate converting device comprising a reception rate converting section for receiving a reception input data signal, a reception clock signal, and a reception frame signal each of which is obtained on the basis of said output data signal, said reception input data signal having said second transmission rate, said reception frame pulse signal being representative of a frame period of said reception input data signal, said reception rate converting section being for converting said reception input data signal into a reception output data signal having said first transmission rate in accordance with said reception clock signal and said reception frame pulse signal, wherein said reception rate converting section comprises:

second memory means for memorizing said reception input data signal as a second memorized data signal in accordance with a second write clock signal;

fifth producing means responsive to said reception clock signal and said reception frame pulse signal for producing a second inhibit signal representative of said overhead bit slot;

judging means supplied with said reception input data signal, said reception clock signal, and said reception frame pulse signal for judging whether or not said information signal is representative of a predetermined condition to produce a third inhibit signal representative of a location of said specific overhead bit slot when said information signal is representative of said predetermined condition;

second generating means for generating said second write clock signal in accordance with said reception clock signal to memorize said reception input data signal as said second memorized data signal in said second memory, said second generating means stopping generation of said second write clock signal in response to said second inhibit signal, said second generating means further stopping generation of said second write clock signal in response to said third inhibit signal;

sixth producing means for producing a second clock control signal in accordance with said second write clock signal and a second read clock signal; and seventh producing means for producing said second read clock signal in accordance with said second clock control signal to read said second memorized data signal as a reception output data signal out of said second memory.

6. A rate converting device as claimed in claim 5, wherein said sixth producing means comprises:

a second phase comparator circuit for comparing said second write clock signal with said second read clock signal to produce a second phase control signal representative of a phase difference between said second write clock signal and said second read clock signal; and a second phase locked loop circuit for producing said second clock control signal on the basis of said second control signal.

7. A rate converting device as claimed in claim 6, wherein said second memory is a first-in-first-out memory.

\* \* \* \* \*